United States Patent [19]

Ikebe et al.

[11] Patent Number: 5,121,277
[45] Date of Patent: Jun. 9, 1992

[54] DISC CARTRIDGE WITH SHUTTER AND ASSEMBLING AND MOUNTING MECHANISM THEREFOR

[75] Inventors: Masaru Ikebe; Haruo Shiba, both of Nagano, Japan

[73] Assignee: TDK Corporation, Japan

[21] Appl. No.: 295,294

[22] Filed: Jan. 10, 1989

[30] Foreign Application Priority Data

Jan. 28, 1988 [JP] Japan .................. 63-8850[U]

[51] Int. Cl.⁵ .................................................. G11B 23/03
[52] U.S. Cl. ........................................ 360/133; 369/291
[58] Field of Search .............. 360/133, 291, 444, 289, 360/272

[56] References Cited

U.S. PATENT DOCUMENTS

| | | | |
|---|---|---|---|
| 4,517,617 | 5/1985 | Tsuji et al. | 360/133 |
| 4,614,990 | 9/1986 | Saito | 360/133 |
| 4,648,001 | 3/1987 | Komatsu et al. | 360/133 |
| 4,680,662 | 7/1987 | Fukushima et al. | 360/133 |
| 4,682,260 | 7/1987 | Oishi et al. | 360/133 |
| 4,811,151 | 3/1989 | Kanazawa et al. | 360/133 |
| 4,908,817 | 3/1990 | Sandell et al. | 360/133 |
| 4,945,530 | 7/1990 | Sandell et al. | 360/133 |

Primary Examiner—John H. Wolff
Assistant Examiner—Craig A. Renner
Attorney, Agent, or Firm—Steinberg & Raskin

[57] ABSTRACT

A disc cartridge capable of readily and simultaneously accomplishing assembling of a shutter and mounting of the shutter on a casing to improve operating efficiency and workability in manufacturing of the disc cartridge. The disc cartridge includes a shutter formed of a slider and upper and lower shutter plates into a U-shape and a shutter assembling and mounting mechanism. The mechanism includes a pair of engagement holes provided on each of shutter plates and a pair of projections provided on a slider corresponding to each shutter plate and engaged with the holes to carry out secure positioning between the slider and the shutter plate. The mechanism also includes a fit-in element provided on each of the shutter plates and a fit-on element arranged on the slider corresponding to each fit-in element. The fit-in element is securely fitted in the fit-on element to accomplish joining between each of the shutter plate and the slider. Fitting between the fit-in element and the fit-on element is carried out substantially simultaneously with engagement between the holes and the projection.

11 Claims, 6 Drawing Sheets

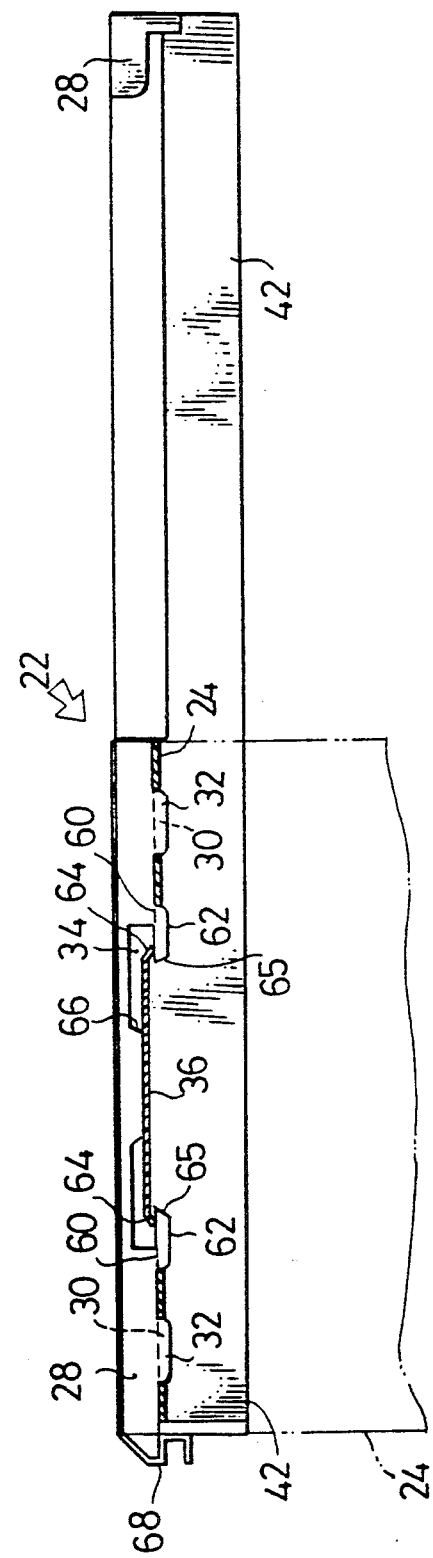

DISC CARTRIDGE WITH SHUTTER AND ASSEMBLING AND MOUNTING MECHANISM THEREFOR

BACKGROUND OF THE INVENTION

1. Field of the Invention

This invention relates to a disc cartridge, and more particularly to a disc cartridge in which a disc medium such as a hard disc like an optical disc, a photomagnetic disc or a magnetic disc, a floppy disc, or the like is rotatably received.

2. Description of the Prior Art

Conventionally, a tray system or a cartridge system using a casing has been generally employed for protecting a floppy disc, a compact disc, a video disc or the like which is used for a digital-data storing unit, a video unit or the like from damage and dust to ensure its safety during its storage and operation. For this purpose, the casing is provided with a slidable shutter made of metal which is operated to close a pickup inserting hole and/or a drive shaft inserting hole of the casing in nonuse and open them in use.

Such a shutter is generally formed of a metal plate into a substantially U-shape. For this purpose, the metal plate is subjected to stamping and bending to make the shutter having a slider integrally formed. Unfortunately, this leads to waste of a metal material and renders manufacturing of the shutter highly troublesome. Also, the above-described construction of the so-formed therein conventional shutter causes shutter operating pin to strike against the shutter to wear and/or damage the pin, resulting in generation of dust such as metal powder and the like.

Assembling of the conventional shutter is often carried out by mounting the slider on a U-shaped shutter body by means of screws. However, this causes the number of parts to be highly increased, as well, as makes manufacturing of the shutter different due to the necessity of formation of a metal plate into the U-shaped shutter body by pressing and bending, so that operating efficiency and productivity of the shutter and therefore the disc cartridge may be extremely reduced.

In view of the foregoing, a shutter of a so-called three-part structure was proposed which comprises two shutter plate members and a slider connected to the shutter plate members through engagement between projections and recesses of the slider and the shutter plate members, as disclosed in Japanese Utility Model Application Laying-Open Publication No. 63879/1984, In the proposed shutter, assembling of the shutter and mounting of the shutter on a casing of a disc cartridge are carried out in a manner to mount the slider on the casing and then connect the shutter plate members to the slider. Alternatively, they are conducted by connecting the slider and shutter plate members together to form or assemble the shutter and then mounting the shutter on the casing.

However, for such assembling and mounting of the shutter, it is required to deform an end of each of the shutter plate members into a shape sufficient to permit it to be inserted under a holding plate of the casing in order to ensure smooth operation of the shutter, when it is needed to form each shutter plate member into an elongated shape as in an optical disc cartridge. Thus, assembling and mounting of the shutter are highly troublesome, resulting in the operating efficiency and productivity still being reduced.

Accordingly, it would be highly desirable to develop a disc cartridge which is capable of facilitating assembling of a shutter and mounting of the shutter on a casing to significantly improve its productivity.

SUMMARY OF THE INVENTION

Generally speaking, in accordance with the present invention, a disc cartridge is provided. The disc cartridge includes a casing formed with at least one pickup inserting hole and having a disc rotatably received therein. The disc cartridge also includes a shutter which is formed of upper and lower shutter plates and a slider for connecting the upper and lower shutter plates therethrough to each other into a substantially U-shape and slidably fitted on the casing for operating the pickup inserting hole. In the present invention, assembling of the shutter and mounting of the shutter on the casing is carried out by a shutter assembling and mounting mechanism arranged at a joint region of the shutter between the slider and each of the shutter plates.

In a preferred embodiment of the present invention, the shutter assembling and mounting mechanism comprises at least one engagement hole and at least one projection which are arranged opposite to each other at the joint section so that they may be engaged with each other for the assembling and mounting, and a fit-in element and a fit-on element arranged opposite to each other at the joint region and engaged with each other for the assembling and mounting.

Accordingly, it is an object of the present invention to provide a disc cartridge which is capable of significantly improving its operating efficiency and productivity.

It is another object of the present invention to provide a disc cartridge which is capable of facilitating assembling of a shutter and mounting of the shutter on a casing.

It is a further object of the present invention to provide a disc cartridge which is capable of simultaneously accomplishing assembling of a shutter and mounting of the shutter on a casing.

It is still another object of the present invention to provide a disc cartridge which is capable of ensuring smooth and positive actuation of a shutter.

It is yet another object of the present invention to provide a disc cartridge which is capable of ensuring a safe and stable operation of a disc.

It is still a further object of the present invention to provide a disc cartridge which is capable of permitting its appearance to exhibit good aesthetic properties.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is made to the following description taken in connection with the accompanying drawings in which like reference numerals designate like or corresponding parts throughout, wherein:

FIG. 8 is a fragmentary enlarged plan view in section showing a shutter.

DETAILED DESCRIPTION OF THE PREFERRED EMBODIMENT

Figure 1:
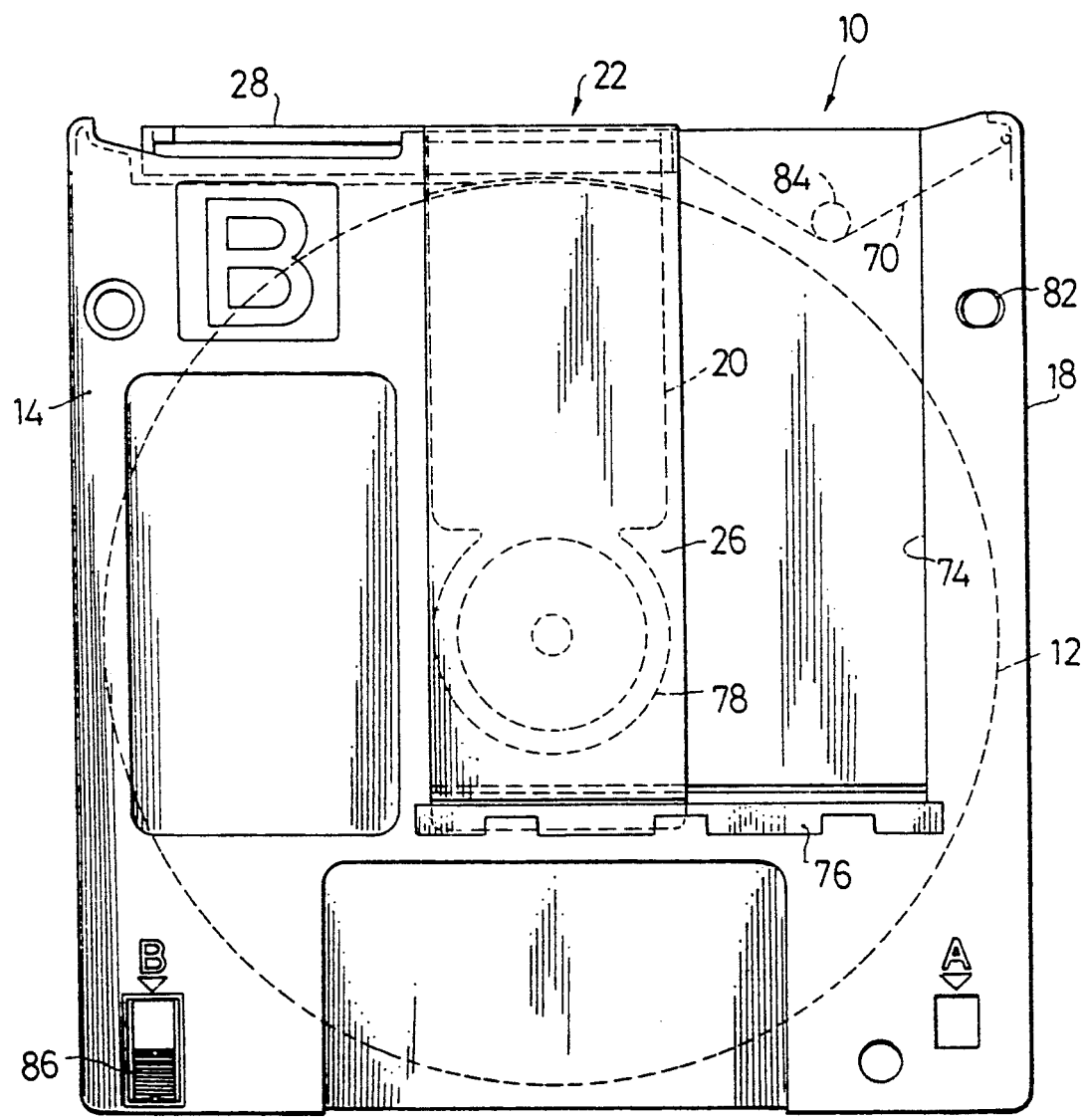
FIG. 1 is a bottom view showing an embodiment of a disc cartridge according to the present invention.
Figure 2:
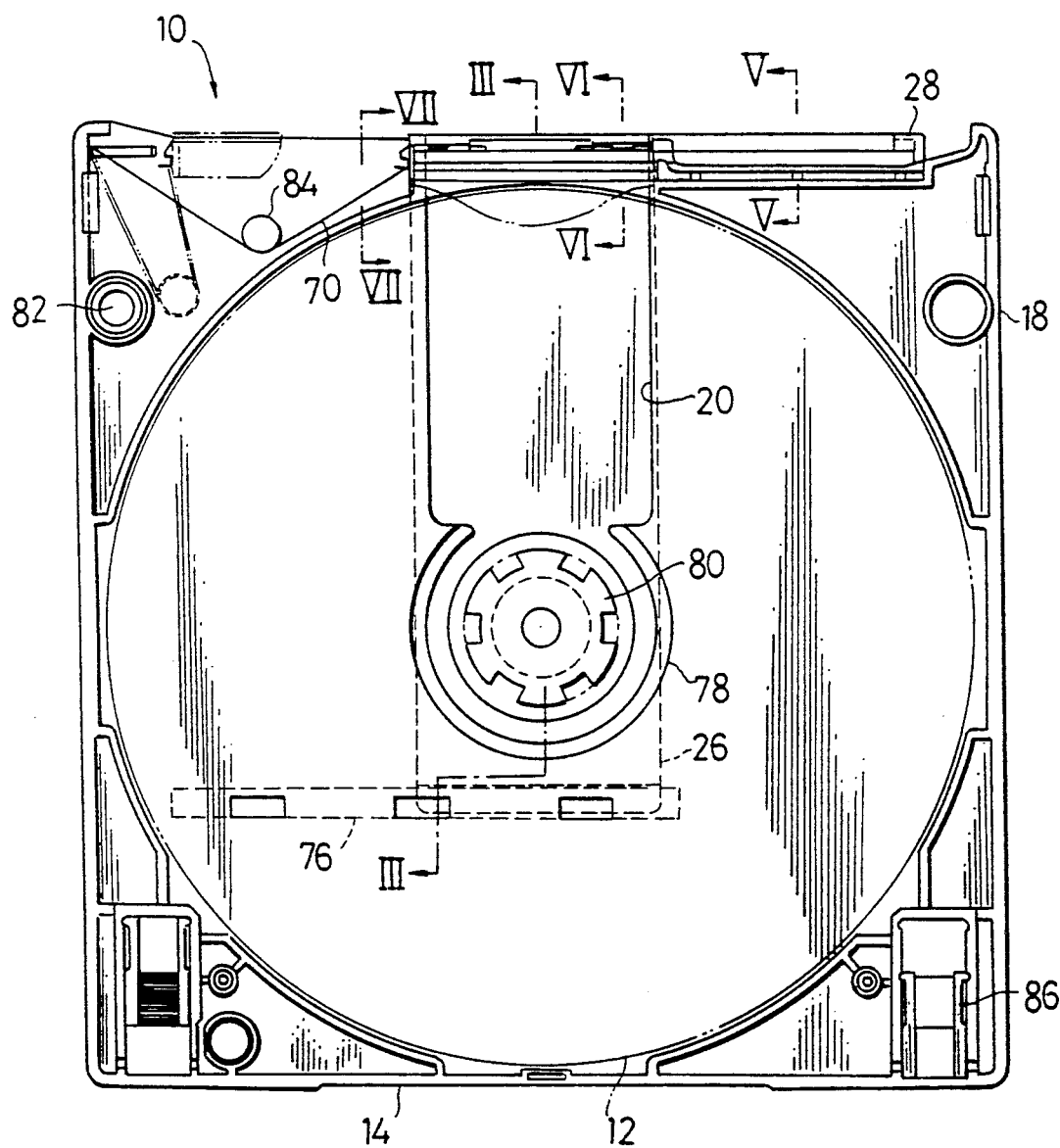
FIG. 2 is a plan view of the disc cartridge shown in FIG. 1 wherein an upper casing member is removed for the sake of brevity.
Figure 3:
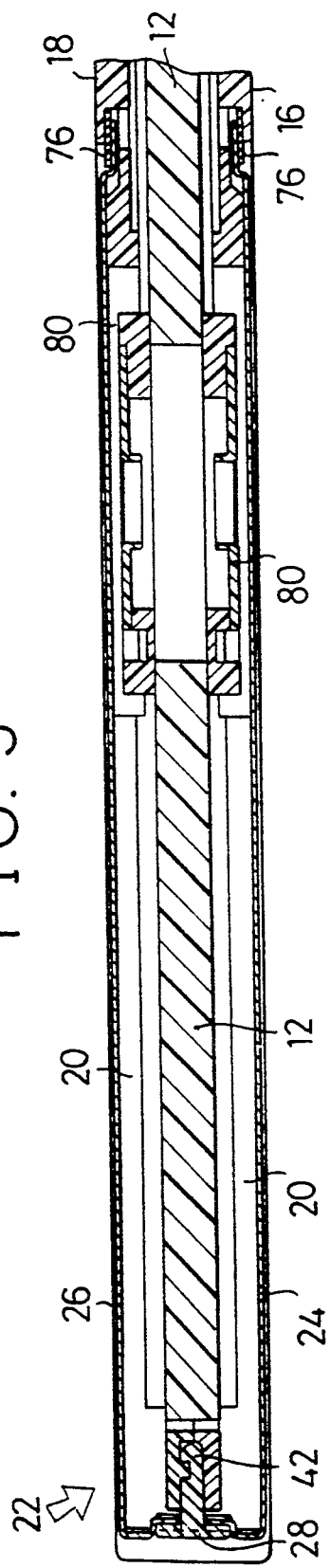
FIG. 3 is an enlarged vertical sectional view taken along line III—III of FIG. 2.

Now, a disc cartridge according to the present invention will be described hereinafter with reference to the accompanying drawings.

The following description will be made in connection with an optical disc cartridge, however, the present invention is not limited to such an optical disc cartridge.

FIGS. 1 to 8 illustrate an optical disc cartridge which is an embodiment of a disc cartridge according to the present invention. An optical disc cartridge of the illustrated embodiment generally designated by reference numeral 10 includes an optical disc 12 and a casing 14 for rotatably receiving the disc 12 therein. The casing 14 is formed by joining an upper casing member 16 and a lower casing member 18 together to define a disc receiving space therein. The casing 14 is formed with at least one pickup inserting hole 20 for inserting a recording and/or reproducing pickup of a disc cartridge operating unit therethrough into the cartridge. In the illustrated embodiment, the pickup inserting hole 20 is formed into a rectangular shape and arranged at each of the upper and lower casing members 16 and 18.

The disc cartridge also includes a shutter 22 slidably mounted or fitted on the casing 14 for operating the pickup inserting holes 20 while interposing upper and lower surfaces of the casing 14. For this purpose, the shutter 22 is formed into a substantially U-shape. More particularly, &he shutter 22 includes upper and lower shutter plates 24 and 26 and a slider 28 for connecting the upper and lower shutter plates 24 and 26 to each other therethrough. Thus, the slider 28 serves as a vertical side wall of the shutter 20 as well as provides the shutter 22 with a sliding function. The upper and lower shutter plates 24 and 26 are substantially symmetrically formed and may be made of stainless steel such as SUS 304, and the slider 28 is preferably made of a lubricious material such as polyacetal.

The shutter 22 is provided with a shutter assembling and mounting mechanism for accomplishing assembling of the shutter and mounting of the shutter on the casing 14. In the illustrated embodiment, the shutter assembling and mounting mechanism is arranged at a joint region of the shutter between each of the upper and lower shutter plates 24 and 26 and the slider 28.

More particularly, the mechanism includes at least one engagement hole 30 and at least one projection 32 which are provided opposite to each other at the joint region between the slider 28 and each of the shutter plates 24 and 26 so that they may be engaged with each other &o carry out at least positioning between the shutter plate and slider for assembling of the shutter and mounting of the shutter on the casing. Accordingly, in the illustrated embodiment, it may be said that the hole 30 and projection 32 constitute positioning means. However, in the present invention, the hole and projection are never limited to such definition.

Further, the shutter assembling and mounting mechanism includes a fit-on element 34 and a fit-in element 36 provided opposite to each other at the joint region so that they may be engaged with each other to carry out secure joining between the slider 28 and the shutter plates 24 and 26. Accordingly, in the illustrated embodiment, it may be said that the fit-on element 34 and fit-in element 36 constitute joining means. However, in the present invention, the fit-in element and fit-on element are not limited to such definition.

The slider 28 is provided on its inner surface 38 and horizontal end surfaces 44 with a slider-side joint 40 opposite to one end of each of the shutter plates 24 and 26. The slider 28 is formed on a central portion of its inner surface 38 with a partition 42 extending in a longitudinal direction thereof, so that the joint 40 of the slider 28 is divided into an upper joint section or upper abutment section 46 and a lower joint section or lower abutment section 48 with the partition 42 being interposed therebetween. The slider 28 is joined to the upper and lower shutter plates 24 and 26 through the so-defined joint or abutment sections 46 and 48 as described hereinafter.

Corresponding to the above-described construction of the slider 28, the upper and lower shutter plates 24 and 26 each are provided at one end thereof with a plate-side joint 50, which is formed in a widthwise direction of the shutter plate and adapted to be joined to the joint 40 of the slider 28. In the illustrated embodiment, the joint 50 of the shutter plate is formed into a stair-like shape so as to have a connection section 52 inwardly extending substantially perpendicular to the shutter plate from the one end of the shutter plate and a substantially L-shaped abutment section 54 connected to the other end of the connection section 52. Thus, the connection section 52 serves to connect the L-shaped abutment section 54 therethrough to the one end of the shutter plate.

The L-shaped abutment section 54 includes a horizontal portion 56 connected at one end thereof to the other end of the connection section 52 so as to inwardly extend in a longitudinal direction of the shutter plate from the connection section 52 and adapted to be abuttedly supported on the horizontal end surface portion 44 of the joint section 46(48) of the joint 40 of the slider 28. The L-shaped abutment section 54 also includes a vertical portion 58 inwardly extending in a direction perpendicular to the shutter plate from the other end of the horizontal portion 56 and adapted to be abutted against the inner surface portion 38 of the abutment section 46(48) of the slider 28.

In the disc cartridge of the illustrated embodiment including the shutter 22 comprising the so-formed slider 28 and shutter plates 24 and 26, the shutter assembling and mounting mechanism includes two such engagement holes 30 arranged at the vertical portion 58 of the joint 50 of the shutter plate in a manner to be laterally spaced from each other and two such projections 32 arranged on the inner surface portion 38 of each of the upper and lower abutment sections 46 and 48 of the slider 28 in a manner to positionally correspond to the engagement holes 30. The fit-on element 34 and fit-in element 36 constituting another part of the engagement mechanism are arranged on the inner surface portion 38 of each abutment section 46(48) of the joint 40 of the slider 28 and the vertical portion 58 of the L-shaped abutment section 54 of the joint 50 of the shutter plate, respectively. In the illustrated embodiment, the fit-on element 34 and fit-in element 36 are arranged in a manner to be interposed between the projections 32 and between the holes 30, respectively. Also, the fit-in element 36 is formed by a central region of the vertical portion 58 defined between a pair of cutouts 60 laterally formed at the vertical portion 58 so as to be spaced from each other and the fit-on element 34 is formed by and between two deformable holding elements or members 62 spacedly arranged on the inner surface portion 38 of the abutment section 46(48) of the joint 50 of the slider 28. The holding elements 62 each are provided on the inner surface portion 38 in a manner to define a gap between the inner surface portion 38 and the element 62 which is sufficient to insert each end of the fit-in element 36 therein, so that the fit-in element 36 of the shutter plate may be interposedly fitted between the holding elements 62 and between the holding elements and the inner surface portion 38 while forcedly pressing the holding elements. For this purpose, the holding elements 62 each may be formed into a substantially L-shape. Each of the holding elements 62 is securely fitted in the corresponding cutout 60 when engagement between the fit-in element 36 and the fit-on element 34 is carried out, as shown in FIG. 8.

The fit-in element 36 may be bent or curved at both ends 64 thereof inserted in the holding members 62 to ensure smooth and firmer joining between the fit-in element 36 and the fit-on element 34. Correspondingly, each of the holding elements 62 may be beveled at a distal end 65 thereof in order to guide the bent end 64 of the fit-in element 36 along the beveled end 65 to facilitate fitting of the fit-in element 36 in the fit-on element 34. The fit-on element may include a stopper 66 for carrying out further secure joining or engagement between the fit-in element and the fit-on element. In the illustrated embodiment, the stopper 66 comprises a projection formed on the inner surface section 38 in a manner to be abutted against the fit-in element 36 to stop movement of the fit-in element 36 fitted in the fit-on element 34.

Figure 4:
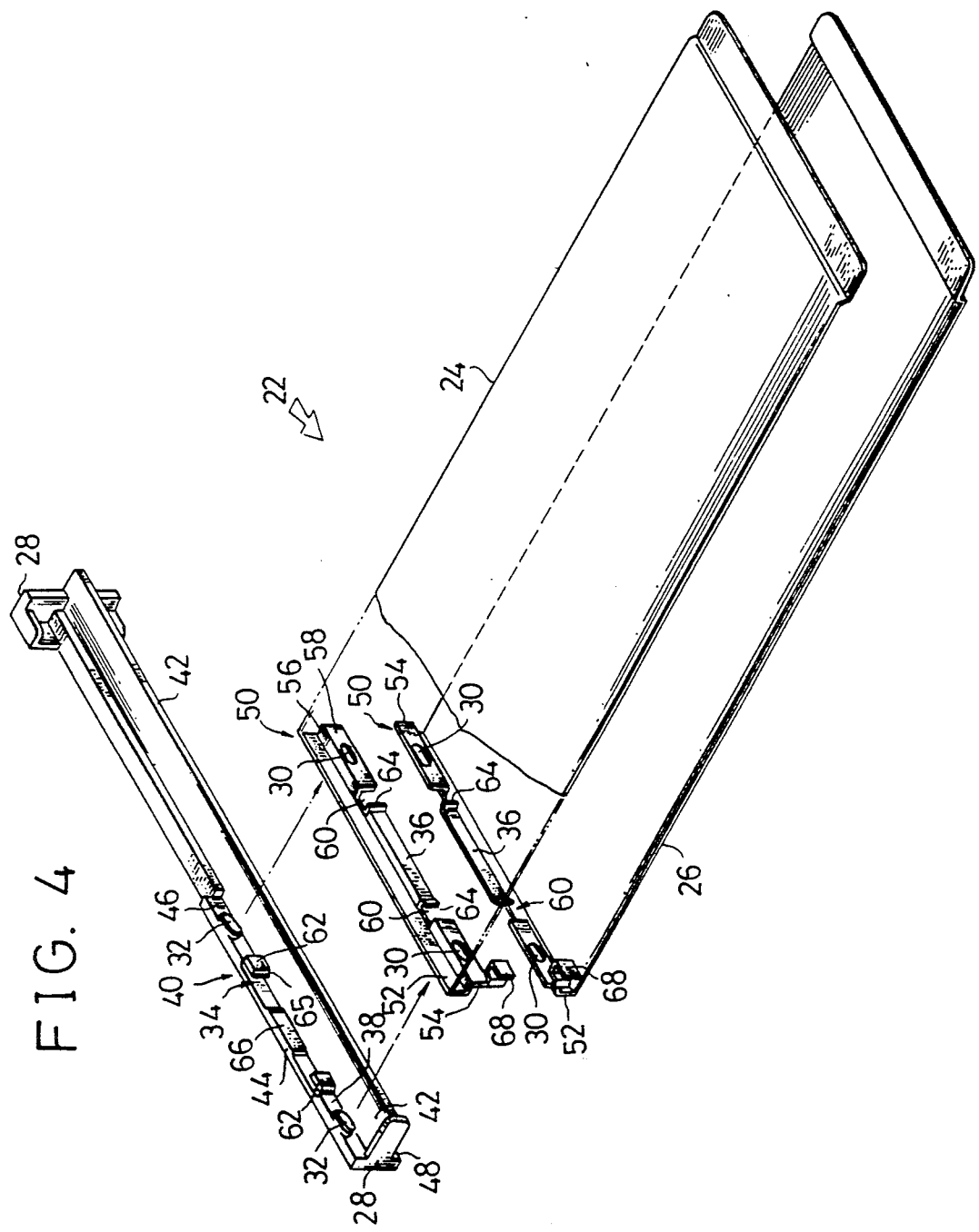
FIG. 4 is an exploded enlarged perspective view showing a shutter.
Figure 6:
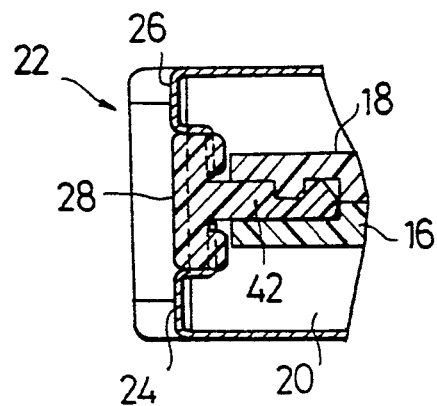
FIG. 6 is an enlarged vertical sectional view taken along line VI—VI of FIG. 2.
Figure 7:
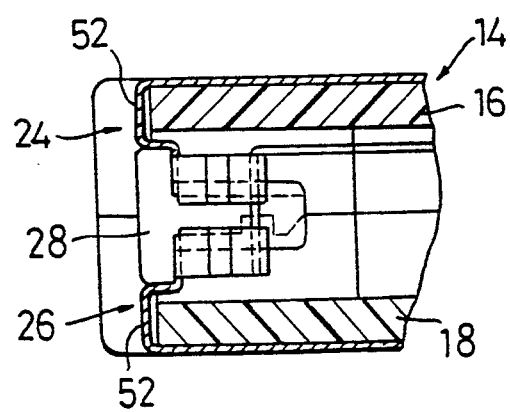
FIG. 7 is an enlarged vertical sectional view taken along line VII—VII of FIG. 2.

The vertical portion 58 of the L-shaped abutment section 54 of the shutter plate is bent at one end thereof to serve as a spring holding portion 68 for holding a restoring spring 70. The spring holding portions 68 of the upper and lower shutter plates 24 and 26 are arranged opposite to each other, as shown in FIG. 4.

In the embodiment described above, the engagement holes 30 and projections 32 constituting a part of the shutter assembling and mounting mechanism are provided at the shutter plate and slider 28, respectively. However, such arrangement may be carried out in the other way. The same applies to arrangement of the fit-on element 34 and fit-in element 36 constituting another part of the mechanism.

Further, in the illustrating embodiment, the mechanism is vertically arranged on the vertical inner surface portion 38 of the slider 28 and the vertical portion 56 of the shutter plate. However, it may be horizontally arranged at the horizontal end surface 44 of the slider 28 and the horizontal portion 56 of the shutter plate.

Figure 5:
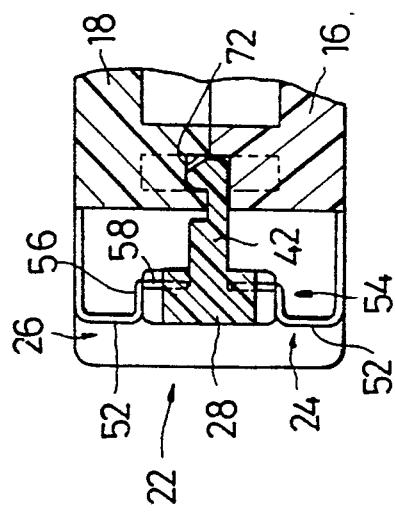
FIG. 5 is an enlarged vertical sectional view taken along line V—V of FIG. 2.

The partition 42 formed on the slider 28 is slidably fitted in an elongated guide groove 72 formed at a side wall of the casing 14 as shown in FIG. 5, so that the upper and lower shutter plates 24 and 26 may be slid in recess-like slide areas 74 formed on outer surfaces of the upper and lower casing members 16 and 18 to operate the pickup inserting holes 20. In order to ensure safe and positive movement of the shutter plates 24 and 26 and therefore the shutter 28, each of the shutter plates is inwardly bent or stepped at a distal end thereof to cause the stepped end to be fittedly inserted under a holding plate 76 provided on the casing 14.

The upper and lower casing members 16 and 18 of the casing 14 each are formed at a central portion thereof with an circular opening 78, in which a hub 80 of the disc 12 is arranged. Also, each of the casing members is formed with a pin inserting hole 82.

The shutter constructed as described above covers each of the pickup inserting holes 20 to close it in non-use of the disc cartridge and is moved to open it in use. The so-moved shutter is returned to its original position by the return spring 70 wound on a guide shaft 84, when it is removed from a disc cartridge operating device.

The upper and lower shutter plates 24 and 26 may be formed of a metal sheet by punching or pressing. The holes 30, fit-in element 34 and spring holder 68 may concurrently be formed by punching or pressing and then the metal sheet may be subjected to bending.

Reference numeral 86 (FIG. 2) designates a misoperation preventing pawl element.

Now, the manner of assembling of the shutter and mounting of the shutter on the casing in the disc cartridge constructed as described above will be described hereinafter.

First, the upper and lower shutter plates 24 and 26 of the shutter 22 are placed on the upper and lower casing members 16 and 18 while inserting their stepped distal ends under the holding plates 76 arranged on the casing members 16 and 18 and then the plate-side joints 50 of the shutter plates 24 and 26 are rendered opposite to each other. Subsequently, the slider 28 is interposed between the upper shutter plate 24 and the lower shutter plate 26. Then, the projections 32 of each of the upper and a lower joint sections 46 and 48 of the slider-side joint 40 are engaged fitted in the engagement holes 30 of each of the shutter plates to carry out at least positioning between the slider and the shutter plates and simultaneously the fit-in element 36 of each of the shutter plates is forcedly fitted in the fit-on section 34 while forcedly pressing the holding elements 62 to carry out joining between the slider 28 and the shutter plates 24 and 26. Thus, in the illustrated embodiment, engagement between the projections 32 and holes 30 and engagement between the fit-in element 36 and the fit-on element 34 are concurrently carried out.

Accordingly, it will be noted that the illustrated embodiment permits assembling of the shutter and mounting of the shutter on the casing to be concurrently accomplished.

As can be seen from the foregoing, the disc cartridge of the present invention includes the shutter assembling and mounting mechanism which is so constructed that at least one engagement hole and at least one projection are provided opposite to each other at the joint region of the shutter between the slider and each of the shutter plates so that they may be engaged with each other to carry out at least positioning between the shutter plate and slider and the fit-on element and the fit-in element are provided opposite to each other at the joint region so that they may be engaged with each other to carry out secure joining between the slider and the shutter plates. Accordingly, the slider is forcedly fitted between the shutter plates to concurrently carry out joining between the slider and the shutter plates to assemble the shutter and secure fitting of the shutter on the casing, after the shutter plates are slidably set on the casing. Thus, it will be noted that the present invention permits assembling of the shutter and mounting of the shutter on the casing to be concurrently and readily accomplished to significantly improve operating efficiency and productivity in manufacturing of the disc cartridge. Also, the present invention ensures satisfactory joining between the slider and the shutter plates and a sliding operation of the shutter, to thereby highly improve reliability in operation of the disc cartridge.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. A disc cartridge comprising:
   a casing formed with at least one pickup inserting hole;
   a disc rotatably received in said casing;
   a shutter formed of upper and lower shutter plates and a slider for connecting said upper and lower shutter plates therethrough to each other into a substantially U-shape, said shutter being slidably fitted on said casing for covering and uncovering said pickup inserting hole; and
   a shutter assembling and mounting mechanism arranged at a joint region of said shutter between said slider and each of said shutter plates for accomplishing assembling of said shutter and mounting of said shutter on said casing;
   wherein said shutter assembling and mounting mechanism comprises a pair of engagement holes and a pair of projections which are arranged opposite to each other at said joint region so that they may be engaged with each other for said assembling and mounting, and a fit-in element and a fit-on element arranged opposite to each other at said joint region and engaged with each other for said assembling and mounting, whereby the shutter plates are positively aligned;
   wherein said fit-in element is provided substantially at a center of a front width on each of said upper and lower shutter plates and said fit-on element is provided on an upper and lower section of said slider corresponding to said fit-in element of each of said shutter plates;
   wherein said fit-on element of said slider is defined by a pair of deformable holding elements provided on said slider in a manner to be laterally spaced from each other and cause distal ends thereof to be opposite to each other and arranged so as to define a gap between each of said holding elements and said slider;
   said pair of engaging holes provided on each side of said fit-in element on each said upper and lower shutter plates and said pair of projections provided on each of said upper and lower sections of said slider at a position opposing said engaging holes;
   said fit-in element of each of said shutter plates being forcedly fitted in said fit-on element while forcedly pressing said deformable holding elements.

2. A disc cartridge as defined in claim 1, wherein said holding elements each are formed into a substantially L-shape.

3. A disc cartridge as defined in claim 2, wherein said holding elements each are beveled at a distal end thereof and said fit-in element is bent at both ends thereof corresponding to said beveling of said holding elements, resulting in facilitating fitting of said fit-in element in said fit-on element.

4. A disc cartridge as defined in claim 1, wherein said slider is formed on an inner surface and upper and lower horizontal end surfaces thereof with a slider-side joint and provided on its inner surface with a partition extending in a longitudinal direction thereof so as to divide said slider-side joint into an upper joint section and a lower joint section through which said slider is joined to said upper and lower shutter plates, respectively; and
   each of said shutter plates is provided at one end thereof with a plate-side joint.

5. A disc cartridge as defined in claim 4, wherein said projections and fit-on element are provided on each of said upper and lower joint sections of said slider and said engagement holes and fit-in element are provided on said plate-side joint.

6. A disc cartridge as defined in claim 5, and wherein said pair of projections are arranged on each of said joint sections of said slider in a manner to be laterally spaced with said fit-on element being interposed therebetween; and
   wherein said pair of engagement holes are arranged on said plate-side joint of each of said upper and lower shutter plates in a manner to positionally correspond to said projections with said fit-in element being interposed therebetween.

7. A disc cartridge comprising:
   a casing formed with at least one pickup inserting hole;
   a disc rotatably received in said casing;
   a shutter formed of upper and lower shutter plates and a slider for connecting said upper and lower shutter plates therethrough to each other into a substantially U-shape, said shutter being slidably fitted on said casing for operating said pickup inserting hole;
   said shutter plates each being provided at one end thereof opposite to said slider with a plate-side joint;
   said slider being formed on at least an inner surface thereof with a slider-side joint and having a partition formed on said inner surface so as to extend in a longitudinal direction thereof, resulting in said slider-side joint being divided into an upper joint section and a lower joint section which are respectively joined to said plate-side joints of said upper and lower shutter plates; and
   a shutter assembling and mounting mechanism arranged to extend over said plate-side joint of each of said upper and lower shutter plates and said slider-side joint of said slider for carrying out assembling of said shutter and mounting of said shutter on said casing;

said shutter assembling and mounting mechanism comprising a pair of engagement holes provided on both said plate-side joints or on said upper and said lower joint sections of said slider-side joint in a manner to be laterally spaced from each other in a longitudinal direction thereof and a pair of projections arranged on both said plate-side joints or said upper and lower joint sections of said slider-side joint in a manner to be opposite to said engagement holes and engaged with said engagement holes;

said shutter assembling and mounting, whereby the shutter plates are positively aligned mechanism further comprising a fit-in element provided on both said plate-side joint or on said upper and said lower joint sections of said slider-side joint and a fit-on element arranged on both said plate-side joints and said upper and said lower joint section of said slider-side joint in a manner to be opposite to said fit-in element and such that said fit-in element is engaged with said fit-on element;

said fit-on element being formed by a pair of deformable holding elements provided on both said plate-side joint or said upper and lower joint sections in a manner to be laterally spaced from each other and arranged so as to define a gap between each of said holding elements;

said fit-in element being forcedly fitted in said fit-on elements while forcedly pressing said holding elements.

8. A disc cartridge as defined in claim 7, wherein said fit-in element is arranged between said engagement holes and said fit-on element is arranged between said projections.

9. A disc cartridge as defined in claim 7, wherein said fit-on element is arranged between said engagement holes and said fit-in element is arranged between said projections.

10. A disc cartridge as defined in claim 7, wherein said slider-side joint and said plate-side joints are arranged along a vertical plane.

11. A disc cartridge as defined in claim 7, wherein said slider-side joint and said plate-side joints are arranged along a horizontal plane.

* * * * *